(12) United States Patent
Kim

(10) Patent No.: US 7,033,177 B2
(45) Date of Patent: Apr. 25, 2006

(54) MOTION SIMULATOR

(76) Inventor: Eui-sok Kim, 129-806 Hanbit Apartment 99 Uh-eun-dong, Yoosung-gu, Daejeon-city (KR) 305-333

( * ) Notice: Subject to any disclaimer, the term of this patent is extended or adjusted under 35 U.S.C. 154(b) by 0 days.

(21) Appl. No.: 10/855,643

(22) Filed: May 28, 2004

(65) Prior Publication Data

US 2005/0142520 A1   Jun. 30, 2005

Related U.S. Application Data

(63) Continuation of application No. PCT/KR02/02246, filed on Nov. 29, 2002.

(30) Foreign Application Priority Data

Nov. 29, 2001 (KR) .................. 10-2001-0075098

(51) Int. Cl.
*G09B 19/16* (2006.01)
*G09B 9/08* (2006.01)

(52) U.S. Cl. .................. 434/58; 434/29; 434/30; 434/62

(58) Field of Classification Search ............ 434/29–69, 434/365; 472/47, 59, 60; 482/4; 463/46; 73/865.3
See application file for complete search history.

(56) References Cited

U.S. PATENT DOCUMENTS

| | | | |
|---|---|---|---|
| 3,196,557 A * | 7/1965 | Davidsen et al. ............. 434/55 |
| 3,760,510 A * | 9/1973 | Anderson, Jr. ................ 434/55 |
| 4,710,128 A * | 12/1987 | Wachsmuth et al. .......... 434/46 |
| 4,790,755 A * | 12/1988 | Leduc et al. .................. 434/37 |
| 4,917,610 A * | 4/1990 | Whiteman .................... 434/33 |
| 5,051,094 A * | 9/1991 | Richter et al. ................ 434/30 |
| 5,197,341 A * | 3/1993 | Steeves ...................... 73/865.3 |
| 5,453,011 A * | 9/1995 | Feuer et al. .................. 434/38 |
| 5,507,647 A * | 4/1996 | Morris ........................ 434/55 |
| 5,622,503 A * | 4/1997 | Feng ........................... 434/36 |
| 5,759,107 A * | 6/1998 | Nagel .......................... 472/47 |
| 5,791,903 A * | 8/1998 | Feuer et al. .................. 434/38 |
| 5,810,596 A * | 9/1998 | Van Lookeren Campagne . 434/62 |
| 5,921,780 A * | 7/1999 | Myers ......................... 434/69 |
| 5,931,739 A * | 8/1999 | Layer et al. .................. 472/60 |
| 6,007,338 A * | 12/1999 | DiNunzio et al. ............ 434/55 |
| 6,142,877 A * | 11/2000 | Nishimura ................... 463/46 |
| 6,331,152 B1 * | 12/2001 | Holle ............................ 482/4 |
| 6,406,299 B1 * | 6/2002 | Murao et al. ................ 434/29 |
| 6,431,872 B1 | 8/2002 | Shiraishi et al. |
| 6,592,374 B1 * | 7/2003 | Kim ............................ 434/58 |
| 6,609,912 B1 * | 8/2003 | Harashima et al. ........... 434/61 |

(Continued)

FOREIGN PATENT DOCUMENTS

GB         2 354497 A    3/2001

(Continued)

*Primary Examiner*—Joe H. Cheng
(74) *Attorney, Agent, or Firm*—Winston & Strawn LLP

(57) ABSTRACT

A motion simulator includes a stationary frame, a movable frame pivotally connected with the stationary frame, an operating chamber formed at a lower side of one end of the movable frame, a first actuator for pivoting the movable frame, and a second actuator arranged between the operating chamber and the movable frame, for rotating the operating chamber in forward and backward directions with respect to the movable frame.

11 Claims, 16 Drawing Sheets

U.S. PATENT DOCUMENTS

| | | | |
|---|---|---|---|
| 6,634,885 B1 | 10/2003 | Hodgetts et al. | |
| 6,719,563 B1 | 4/2004 | Donges | |
| 6,776,722 B1* | 8/2004 | De-Gol | 472/59 |
| 2003/0219702 A1* | 11/2003 | McClintic | 434/45 |
| 2003/0224333 A1* | 12/2003 | Vastvedt | 434/29 |

FOREIGN PATENT DOCUMENTS

| | | |
|---|---|---|
| JP | 2001092344 | 4/2001 |
| JP | 2001142386 | 5/2001 |
| KR | 20-0205224 Y1 | 12/2000 |

\* cited by examiner

MOTION SIMULATOR

CROSS-REFERENCE TO RELATED APPLICATIONS

This application is a continuation of International application PCT/KR02/02246 filed Nov. 29, 2002, the entire content of which is expressly incorporated herein by reference thereto.

TECHNICAL FIELD

The present invention relates to a motion simulator, and more particularly, it relates to an improved motion simulator in which occurrence of undesired moving sensations are eliminated during the creation of moving sensations using gravity and thereby creation of a moving sensation which is more similar to the actual situation is possible.

BACKGROUND ART

Generally, a motion simulator refers to a device which simulates motions of objects in a wide space such as an airplane or an automobile and allows people to feel similar moving sensations within a limited space.

As a general motion simulator such as the above, a 6 DOF (degree of freedom) motion simulator 100 in which a movable frame 120 is driven by six actuators 131, 132, 133, 134, 135, 136 is depicted in FIGS. 1 to 3b.

As depicted in FIG. 1, the conventional 6 DOF motion simulator 100 has a structure which includes a stationary frame 110, a movable frame 120 and a plurality of actuators 131, 132, 133, 134, 135, 136.

The stationary frame 110 is installed fixedly against the ground (gravity field). The movable frame 120 is disposed above the gravitational direction of the stationary frame 110. An operating chamber 140 is disposed on the top surface of the movable frame 120.

The plurality of actuators 131, 132, 133, 134, 135, 136 are disposed between the stationary frame 110 and the movable frame 120. Electric, hydraulic, or pneumatic actuators are generally used for each of the actuators 131, 132, 133, 134, 135, 136.

Each of the actuators 133, 132, 133, 134, 135, 136 is rotatably connected at both ends thereof to the stationary frame 110 and the movable frame 120 by respective pairs of universal joints 131a and 131b, 132a and 132b, 133a and 133b, 134a and 134b, 135a and 135b, 136a and 136b.

The conventional 6 DOF motion simulator 100 configured as the above allows the passenger 170 in the operating chamber 140 to feel moving sensations similar to those felt when actually riding an airplane or automobile by driving the plurality of actuators 131, 132, 133, 134, 135, 136 and thereby moving the movable frame 120.

For instance, for a racing car that has suddenly taken off and continues to accelerate, the passenger feels sensations of being pulled backward due to acceleration, and this sensation is continued while acceleration after start is being progressed.

To create such sensation, the motion simulator 100 drives the plurality of actuators 131, 132, 133, 134, 135, 136 and firstly accelerates the movable frame 120 forward, as depicted in FIG. 2a. In the above case, the passenger 170 within the operating chamber 140 feels a pulling sensation from the rear due to the force of inertia.

However, because the range of motion of the motion simulator 100 has a limit, the movable frame 120 which has been accelerated and moved forward shortly falls within this limit. At this time, as depicted in FIG. 2b, when the movable frame 120 is rotated clockwise, the passenger 170 continues to feel the sensation due to gravity.

On the other hand, as another example, for an automobile turning along a large curve, the passenger feels a pushing sensation to the outer direction of the curve due to centrifugal force, and continues to feel this sensation while the turning is being progressed.

To create such sensation, the motion simulator 100 actuates the plurality of actuators 131, 132, 133, 134, 135, 136 and firstly accelerates the movable frame 120 to the side direction, as depicted in FIG. 3a. In the above case, the passenger 170 within the operating chamber 140 feels a sensation of being pushed in the opposite direction of the movement due to the force of inertia.

However, also for this case, because the range of motion of the motion simulator 100 has a limit, the movable frame 120 which has been accelerated and moved to the side direction shortly falls within this limit. At this time, as depicted in FIG. 3b, when the movable frame 120 is rotated clockwise, the passenger 170 continues to feel said sensation.

On the other hand, in FIGS. 4 to 6, as another example of the conventional motion simulator, a 3 DOF motion simulator 101 of which the movable frame 120 is driven by three actuators 131', 132', 133' is depicted.

According to FIGS. 4 to 6, the configuration of the conventional 3 DOF motion simulator 101 is identical to that of the 6 DOF simulator except that the former has three actuators 131', 132', 133' and that it is provided with a separate support member 150 to limit the occurrence of unintended forward/backward linear motion, left/right linear motion, and rotating motion centered on the top, bottom axes perpendicular to the surface of the movable frame 120.

Therefore, in describing the configuration of the 3 DOF motion simulator 101, same reference numbers are designated for parts identical to those of the 6 DOF motion simulator, and the descriptions thereof are omitted.

Meanwhile, as mentioned above, because all motions of the movable frame 120 can not be restrained with only the actuators 131', 132', 133', in the depicted conventional 3 DOF motion simulator 101, there is provided a separate support member 150 for limiting the occurrence of unintended motion to the movable frame 120.

The support member 150 is composed of a cylinder 151 which is fixed on the stationary frame 110, a piston 152 which moves up and down along the cylinder 151, and a universal joint 153 which connects the piston 152 and the movable frame 120.

In the case of the conventional 3 DOF motion simulator 101 configured as the above, because there is no DOF to the horizontal direction, that is, the direction perpendicular to gravity, when creating continuous accelerating motion or rotating motion as mentioned above, only the force of gravity is used.

Namely, to create a linear accelerating sensation, the motion simulator 101 drives the plurality of actuators 131', 132', 133' and rotate the movable frame 120 and thereby allows the passenger 170 to feel a rearward pulling sensation, as depicted in FIG. 5.

In addition, to create rotating movement, the motion simulator 101 drives the plurality of actuators 131', 132', 133' and rotate the movable frame 120 and thereby allows the passenger 170 to feel a pushing sensation to the other side, as depicted in FIG. 6.

However, according to the conventional motion simulators 100, 101 configured as the above, both simulators have a structure in which the center of gravity of the passenger 170 is above the center of rotation of the movable frame 120.

Due to the above, when representing acceleration from continuous linear acceleration or from centrifugal motion to the side direction, that is, when the movable frame 120 is tilted to utilize gravity, there is the problem of occurrence of undesired acceleration.

This awkward sensation (that is, force) may be expressed with the following equation.

$$A_p = A_v + A \times R_{pv} + \omega \times \omega \times R_{pv}$$

wherein, $A_p$ is the acceleration vector felt by the passenger of the motion simulator, $A_v$ is the acceleration vector of the moving movable frame of the motion simulator, $A$ is rotational acceleration vector of the movable frame, $R_{pv}$ is the relative position vector of the passenger on top of the motion plate, and $\omega$ is the rotational velocity vector.

The awkward sensation is sum of the calculation value of the cross product of $A$ and $R_{pv}$ vectors, which is $A \times R_{pv}$, and the calculation value of the cross product of $\omega$, $\omega$, $R_{pv}$ vectors, which is $\omega \times \omega \times R_{pv}$. Among these, the sensation expressed by $A \times R_{pv}$ gives the most uncomfortable feeling from forward/backward and lateral movement. The present invention eliminates an acceleration factor that is exerted oppositely to the acceleration sensation expected by the passenger.

That is, in the structure of conventional motion simulators 100, 101, because the center of gravity of the passenger 170 exists vertically above the center of rotation of the movable frame 120, when starting to rotate the movable plate, the value of the $A \times R_{pv}$ vector becomes the opposite direction of the acceleration intended to be created.

A graph displaying the above is shown in FIG. 7. The dotted line in FIG. 7 represents the acceleration felt by the driver of an automobile which is suddenly stopped or driven on a curve, and the solid line represents the acceleration/deceleration sensed by the passenger riding on the motion simulator driven by inputting the signals.

In FIG. 7, as shown by the pointed portions bulging out to the minus region in the opposite direction of the changes in the reference signals, in contrary to the intended pushing to one side sensation, a sudden attraction to the opposite side is experienced at the time of sudden change to the acceleration.

As a result of such problems, as shown by the solid line of FIG. 7, a moving sensation in the opposite direction of the moving sensation intended to be created (dotted line of FIG. 7) is applied, and furthermore, the time taken to track the intended moving sensation is delayed. This means a decline in actuality experienced by the passenger.

In the foregoing, the problems of the conventional motion simulator has been described taking the 6 DOF and 3 DOF motion simulators as two types of examples. However, although the extent may vary, the above mentioned problems of conventional motion simulators occur in all motion simulators having different degrees of freedom.

DISCLOSURE OF INVENTION

The present invention has been made to overcome the above-mentioned problems, and accordingly, it is an object of the present invention to provide a motion simulator that allows moving sensations similar to the intended sensations and which reduces tracking time, through the elimination of undesired moving sensations when creating moving sensations using gravity.

The above object is accomplished by a motion simulator according to the present invention, including a stationary frame, a movable frame movably connected to the stationary frame, an operating chamber formed on a lower side of one end of the movable frame, a first driving means for pivoting the movable frame, and a second driving means arranged between the operating chamber and the movable frame, for rotating the operating chamber with respect to the movable frame.

The first driving means includes a heave actuator connected to the other end of the movable frame and to the stationary frame, for reciprocally pivoting the movable frame with its reciprocal movement.

The second driving means includes a plurality of roll/pitch actuators connecting the movable frame and the operating chamber, and a universal joint connected between the operating chamber and the movable frame, for limiting an unintended movement of the operating chamber with respect to the movable frame.

The roll/pitch actuators are provided in pair.

Further provided is a counter means at the other end of the movable frame, for overcoming a weight of the operating chamber on the movable frame.

Further, the counter means includes a counter spring connected between the other end of the movable frame and the stationary frame.

The counter means includes a counter mass formed at the other end of the movable frame, and weighs in correspondence with the weight of the operating chamber.

The first driving means includes a first rotary actuator connected to the other end of the movable frame and to the stationary frame, for pivoting the movable frame upward and downward.

The second driving means includes a second rotary actuator formed between the movable frame and the operating chamber, for independently pivoting the movable frame and the operating chamber on a first and a second axes.

The second rotary actuator includes a cross axis connecting the movable frame and the operating chamber such that the movable frame and the operating chamber are independently pivoted on the first and the second axes, the first axis crossing the second axis, a first driving motor formed on the movable frame, for pivoting the operating chamber about the first axis by pivoting the cross axis about the first axis, and a second driving motor formed in the passenger chamber, for pivoting the operating chamber about the second axis by relatively rotating the cross axis about the second axis.

With the motion simulator as described above according to the present invention, since the operating chamber is formed under the movable frame, the center of gravity of the passenger is positioned under the center of rotation of the movable frame.

In other words, since the $A \times R_{pv}$ vector is in the same direction as that of the acceleration sensations that are intended to be created, undesired accelerating sensations are prevented during the creation of the accelerating sensation using force of gravity, and as a result, the time taken to track the intended moving sensations is shortened, and the moving actuality experience by the passenger is increased.

BEST MODE FOR CARRYING OUT THE INVENTION

The preferred embodiments of the present invention are described in detail with reference to the annexed drawings.

Figure 1:
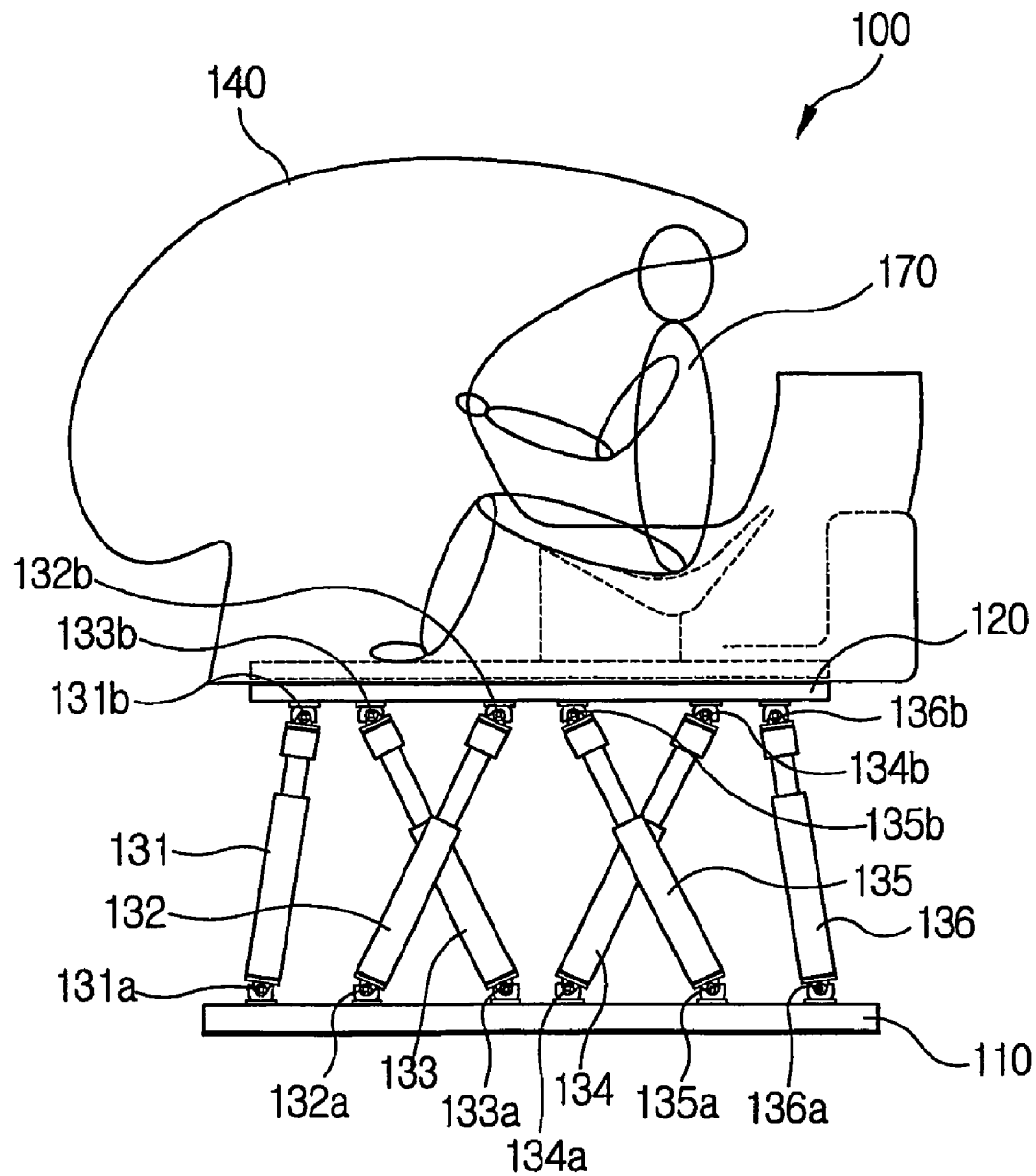
FIG. 1 is a schematic drawing of the structure of a conventional 6 DOF motion simulator.
Figure 2A:
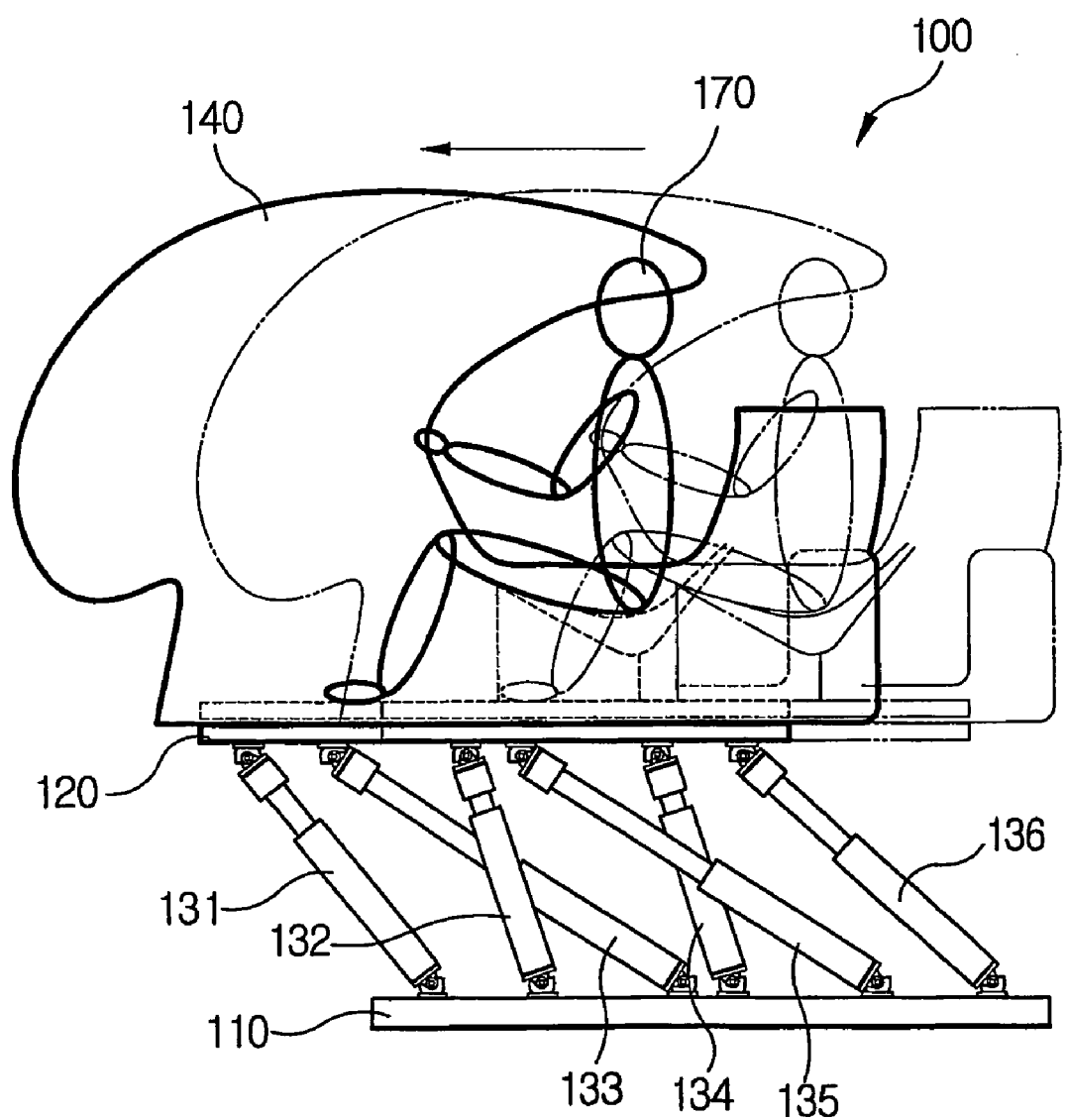
FIGS. 2a and 2b are drawings showing the accelerating sensation creation procedure of the conventional 6 DOF motion simulator.
Figure 2B:
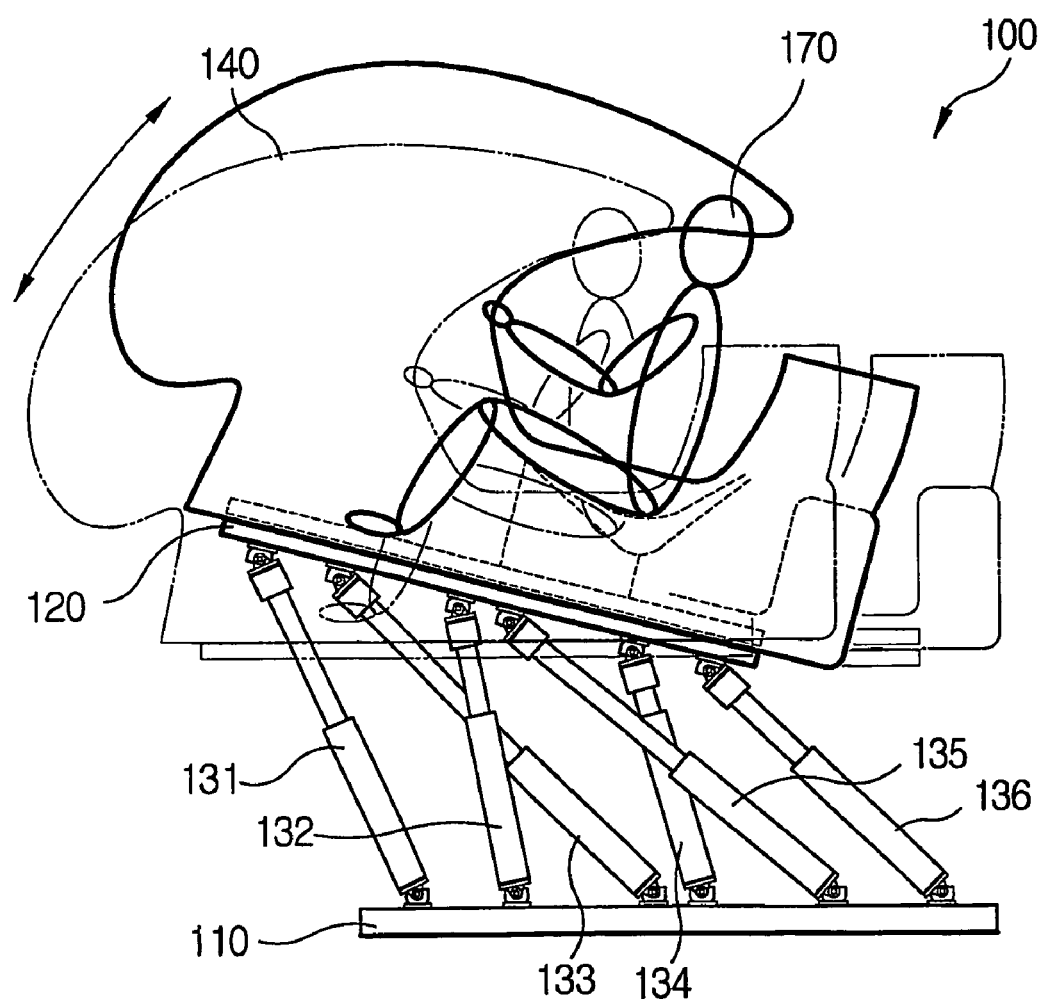
Figure 3A:
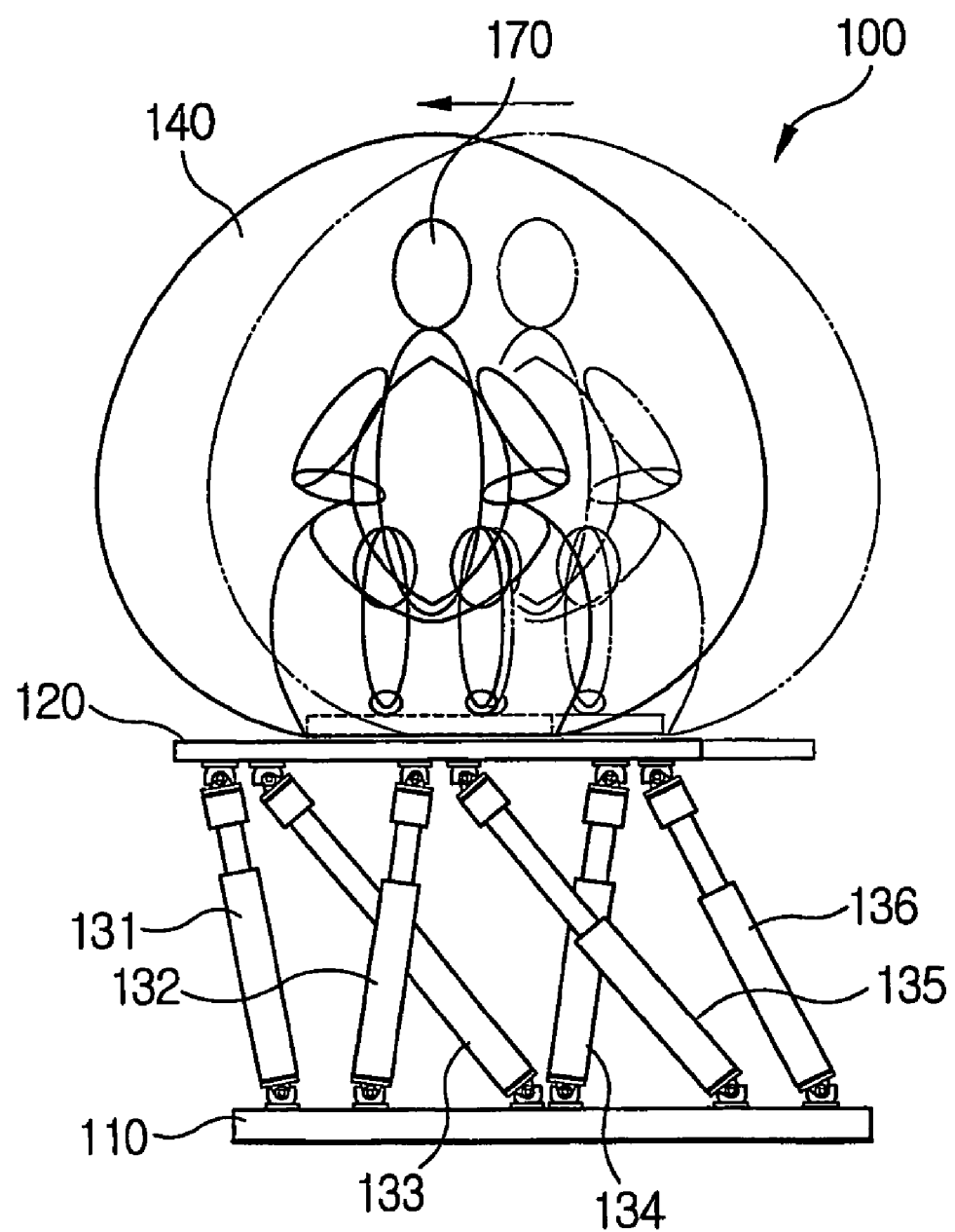
FIGS. 3a and 3b are drawings showing the rotating sensation creation procedure of the conventional 6 DOF motion simulator.
Figure 3B:
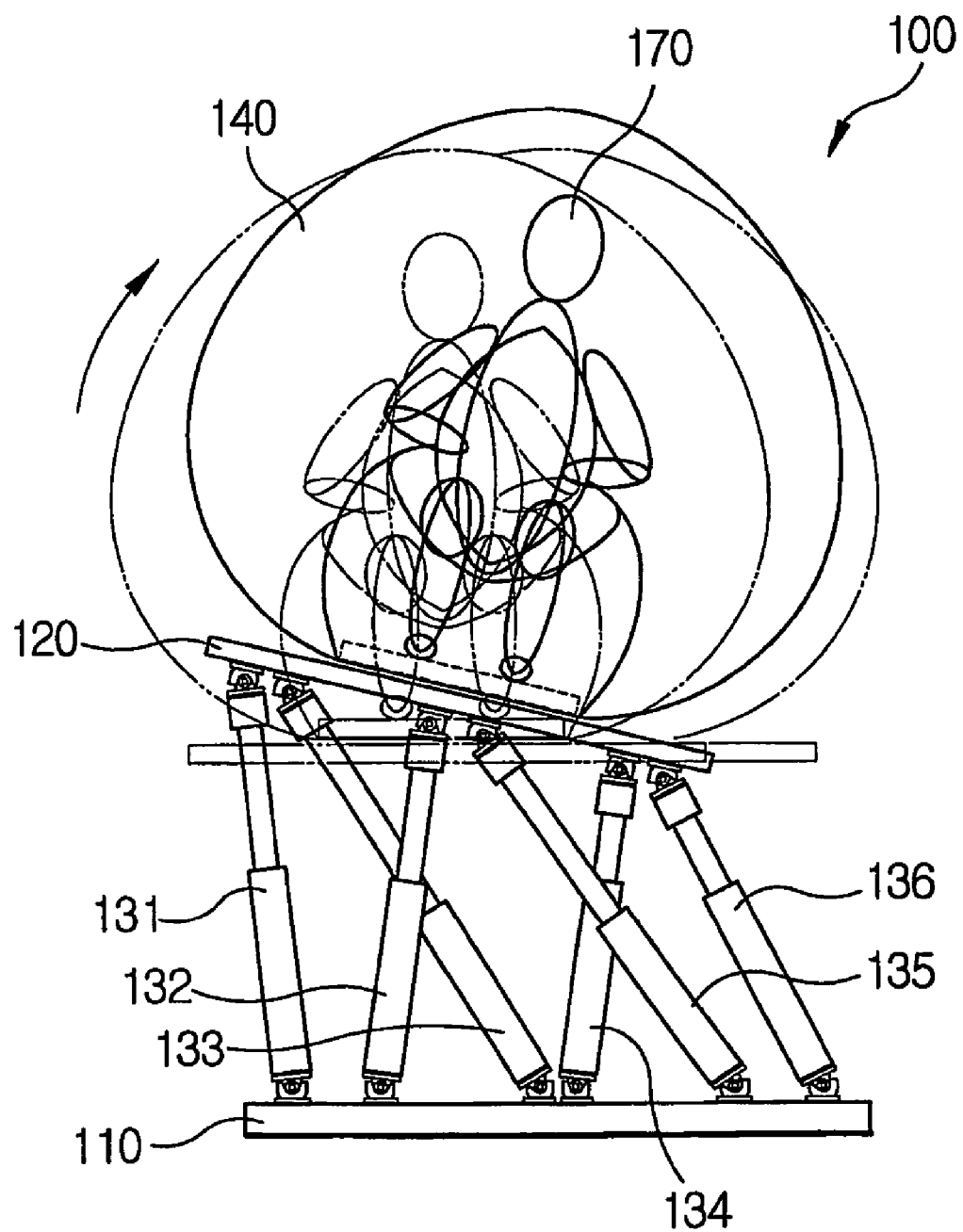
Figure 4:
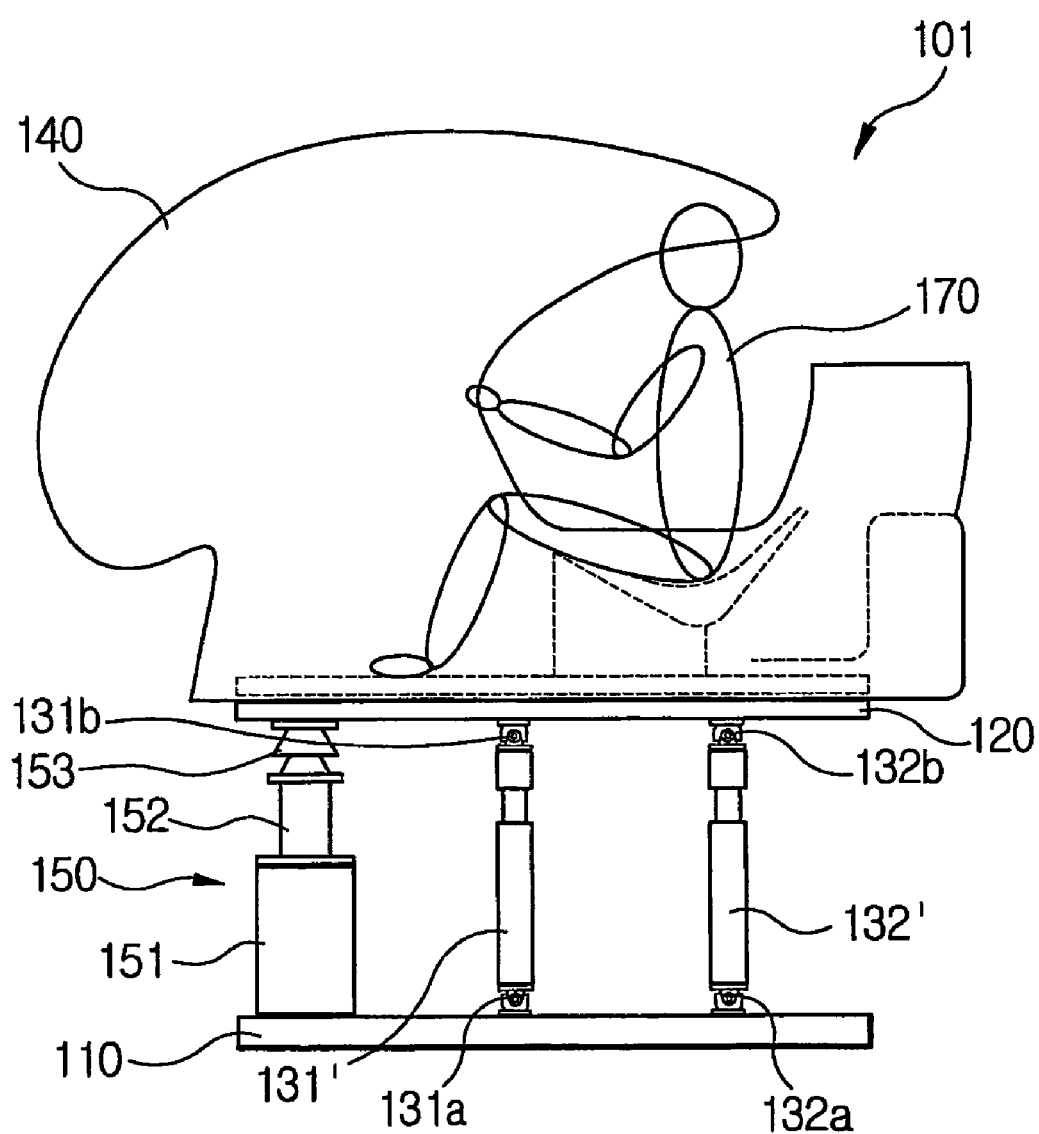
FIG. 4 is a schematic drawing of the structure of the conventional 3 DOF motion simulator.
Figure 5:
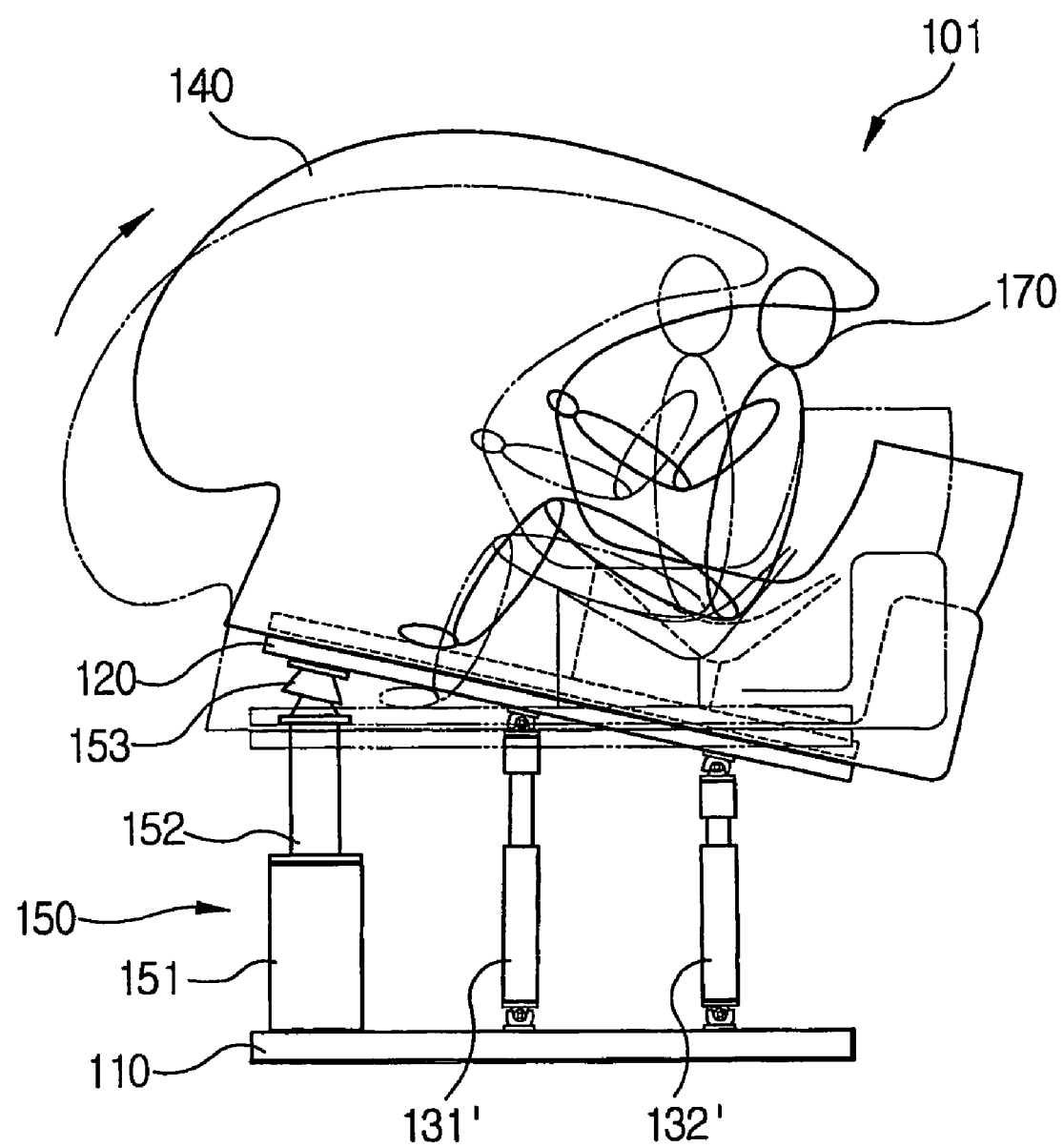
FIG. 5 is a drawing showing the accelerating sensation creation procedure of the conventional 3 DOF motion simulator.
Figure 6:
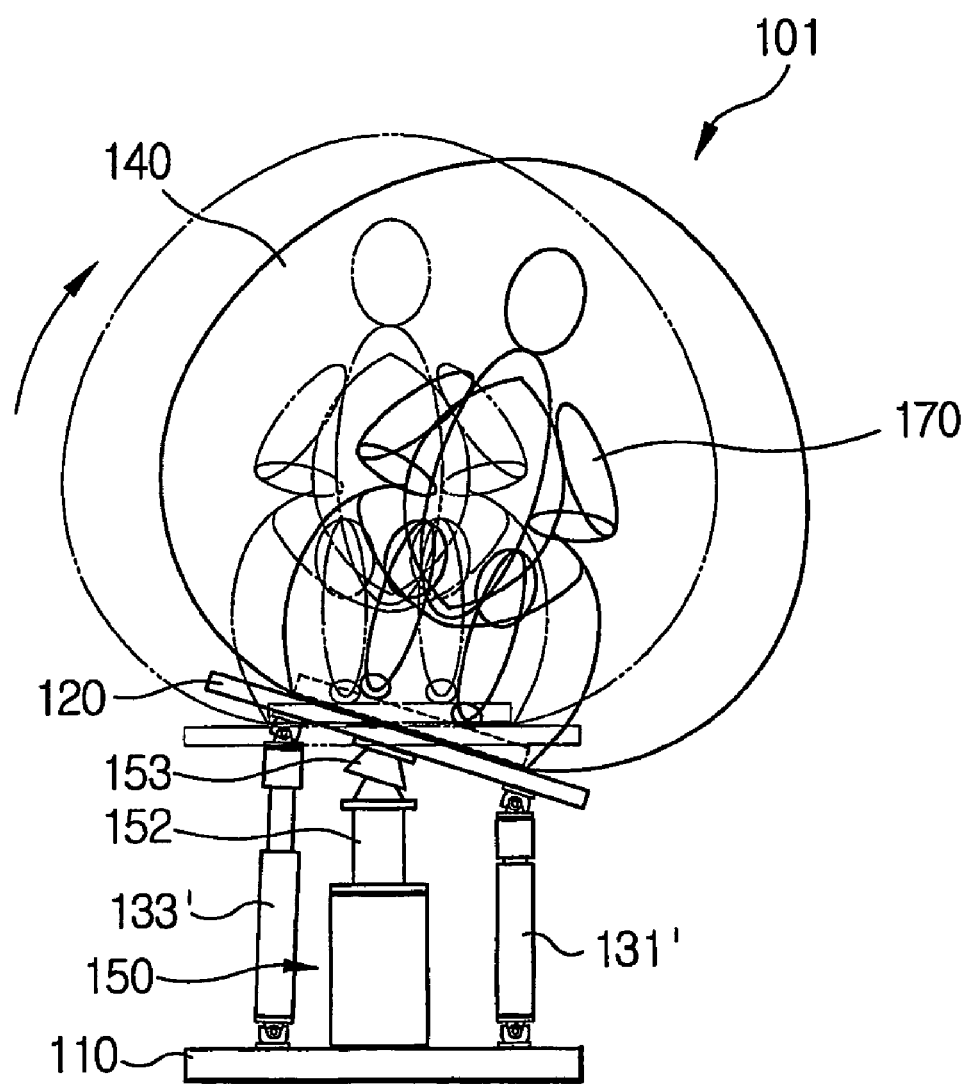
FIG. 6 is a drawing showing the rotating sensation creation procedure of the conventional 3 DOF motion simulator.
Figure 7:
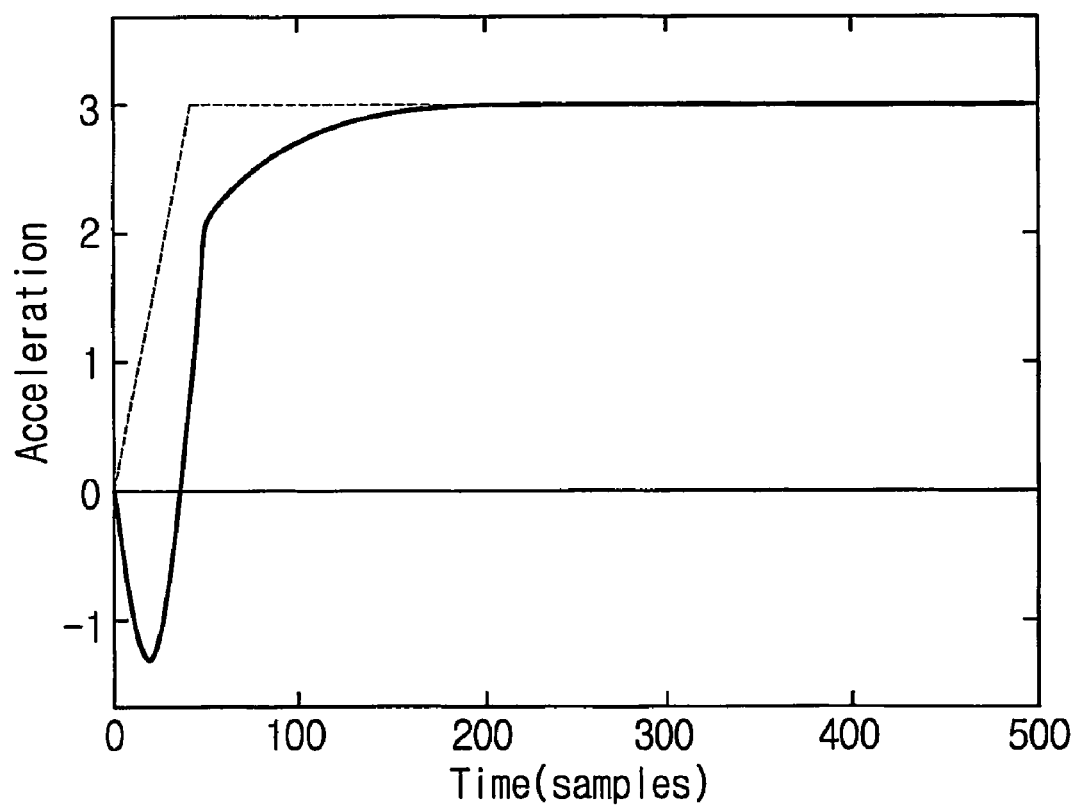
FIG. 7 is a graph showing a conventional motion simulator being driven by inputting fast acceleration signals, and the accelerating/decelerating sensation sensed by a passenger riding the simulator.
Figure 8:
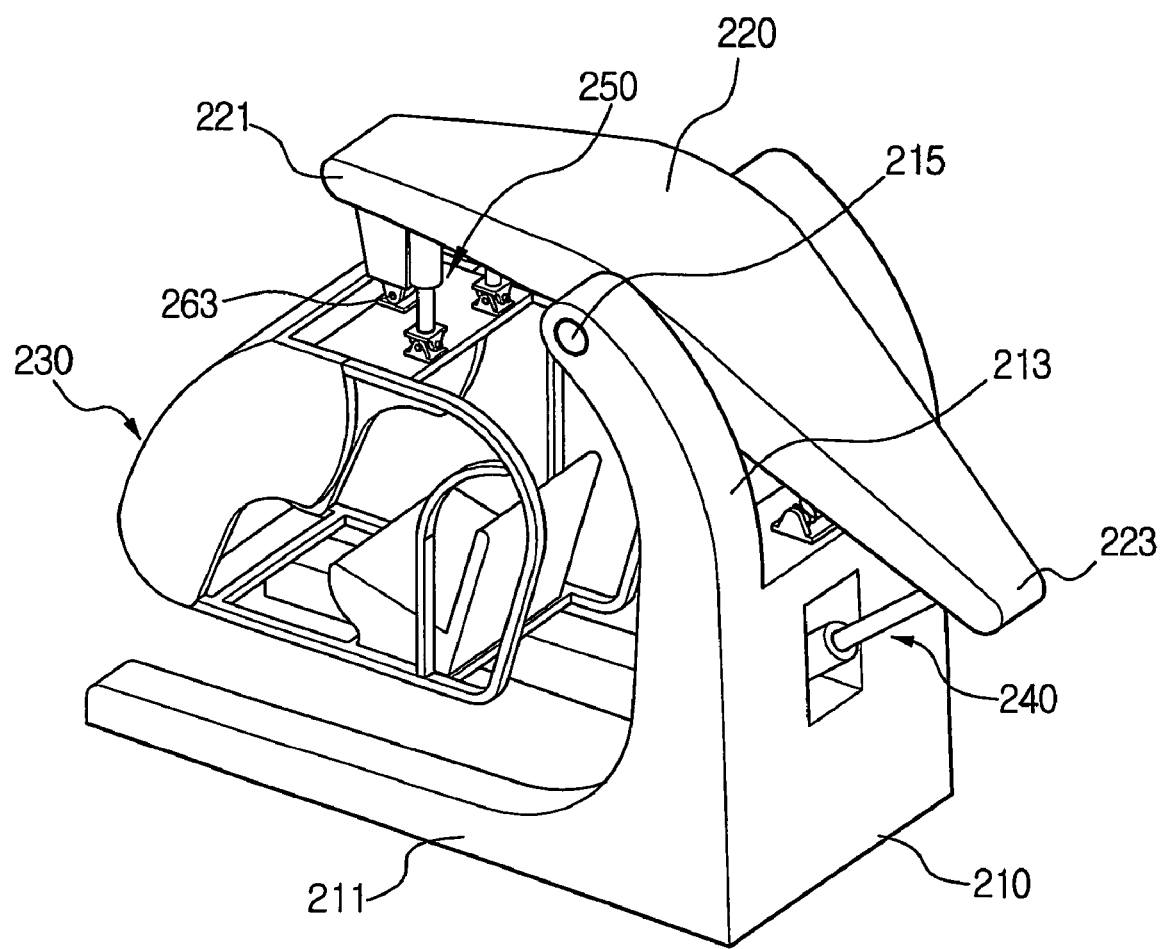
FIG. 8 is a schematic drawing showing a motion simulator according to a preferred embodiment of the present invention.

Referring to FIG. 8, the motion simulator according to one preferred embodiment of the present invention includes a stationary frame 210, a movable frame 220 pivotally formed on the stationary frame 210, an operating chamber 230 arranged at a lower side of one end of the movable frame 220, a first driving means for pivoting the movable frame 220, and a second driving means for moving the operating chamber 230 with respect to the movable frame 220.

The stationary frame 210 is installed fixedly against the ground (gravity field). The stationary frame 210 includes a bottom support 211 at the bottom, and a sidewall support 213 upwardly extended from the bottom support 211. An end of the sidewall support 213 is branched into two ends pivotally supporting the movable frame 220.

The movable frame 220 is pivotally connected with the sidewall support 213 of the stationary frame 210 at its middle to pivot on a pivot 215. The operating chamber 230 is arranged on one end of the movable frame 220, i.e., on a lower side of an upper end 221 in the drawing.

Figure 9:
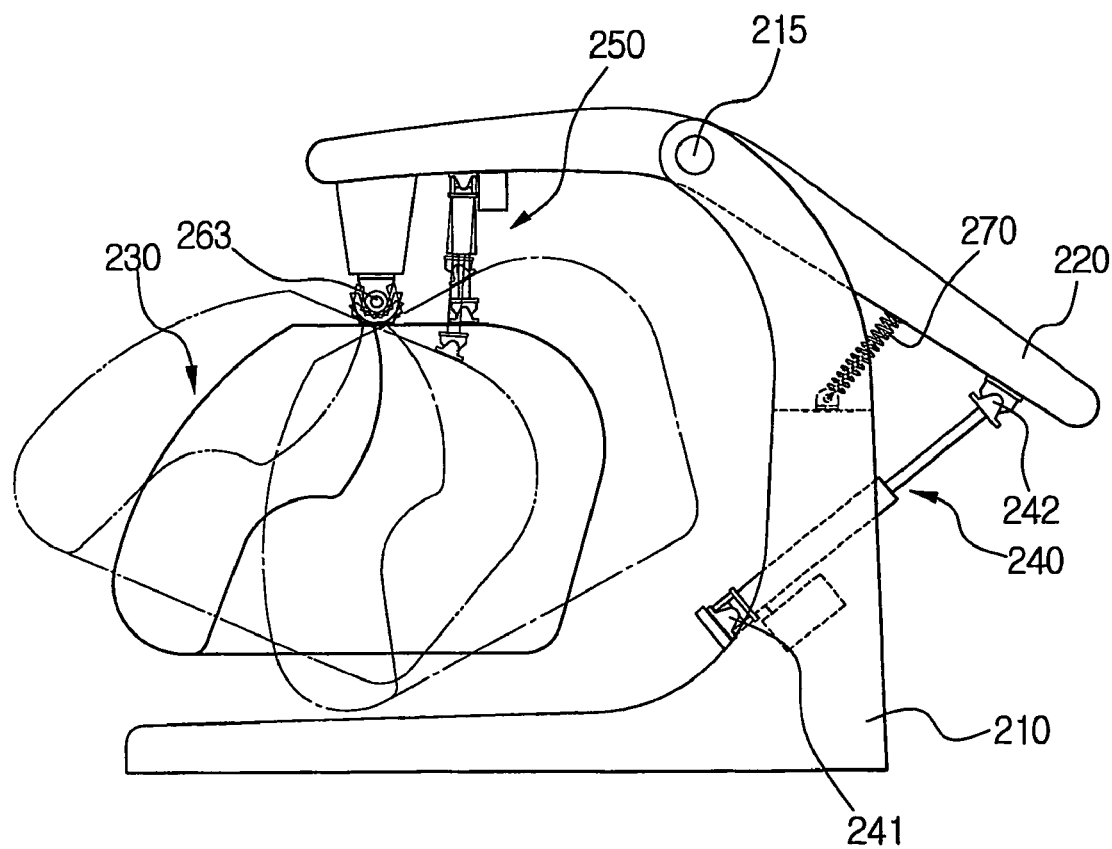
FIG. 9 is a drawing for explaining an accelerating sensation creation procedure of the motion simulator of FIG. 8 for acceleration/deceleration of an automobile.

The first driving means includes a heave actuator 240 connected to the opposite end 223 of the movable frame 220 and the stationary frame 210. The heave actuator 240 reciprocally pivots the movable frame 220 on the pivot 215 with its reciprocal movement. As shown in FIG. 9, the heave actuator 240 are pivotally connected at both ends to the stationary frame 210 and the movable frame 220 with joints 241, 242. Electric, hydraulic, or pneumatic actuator can be used for the heave actuator 240. Also, a rotary actuator, driven through a motor and a reduction gear, may also be used.

The second driving means is arranged between the operating chamber 230 and the movable frame 220, rotating, or moving forward/backward the operating chamber 230 with respect to the movable frame 220. Such second driving means includes a plurality of rotary roll/pitch actuators 250 which connect the movable frame 220 with the operating chamber 230.

A pair of rotary roll/pitch actuators 250 is provided. Both ends of each actuator 250 are rotatably connected to the operating chamber 230 and the movable frame 220 by universal joints 251, 252. In this case also, electric, hydraulic, or pneumatic actuator may be used for the actuators 250.

The universal joint 263 is provided to limit unintended movement of the operating chamber 230 with respect to the movable frame 220. The universal joint 263 is arranged between the operating chamber 230 and the movable frame 220.

Further, in order to overcome the weight of the operating chamber 230 on one end 221 of the movable frame 220, the movable frame 220 preferably includes a counter means provided at the opposite end 223 of the movable frame 220. The counter means includes a counter spring 270 which is connected between the opposite end 223 of the movable frame 220 and the stationary frame 210.

The motion simulator constructed as above according to the preferred embodiment of the present invention, moves the movable frame 220 by driving the heave actuator 240, while moving the operating chamber 230 with respect to the movable frame 220 by driving the pair of roll/pitch actuators 250. Accordingly, the passenger in the passenger chamber 230 feels the similar moving sensations as he/she is riding the airplane or automobile.

For example, as shown in FIG. 9, in order to create continuous accelerating sensation as in the automobile, the motion simulator accelerates the passenger chamber 230 to the left-hand side of FIG. 9 by driving the roll/pitch actuators 250.

By doing so, the operating chamber 230 is moved forward with respect to the center of rotation of the joint positioned above the operating chamber 230, gradually tilting. As the operating chamber 230 starts moving, the passenger in the operating chamber 230 feels he/she is pushed backward by the force of inertia. Then as the operating chamber 230 tilts, the passenger continuously feels that he/she is pushed backward by the force of gravity.

Figure 10:
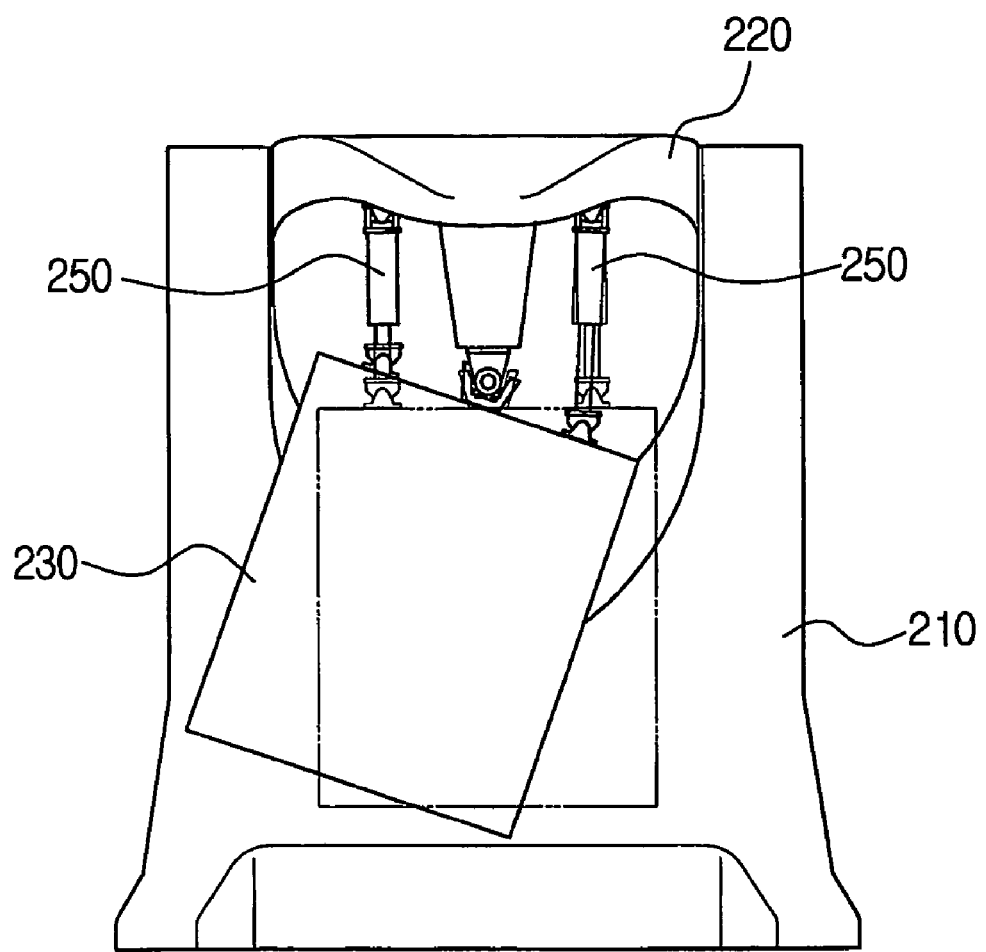
FIG. 10 is a drawing for explaining an accelerating sensation creation procedure of the motion simulator of FIG. 8 for rotation of an automobile.

As for another example, in order to create the rotating sensations by the centrifugal force as in the automobile driving along a curve, as shown in FIG. 10, the motion simulator drives the roll/pitch actuators 250, thereby tilting and accelerating the operating chamber 230 to the side direction. As the movement begins, the passenger in the operating chamber 230 feels as if he/she is pushed in the opposite direction by the force of inertia, and keeps feeling the accelerating sensations in the same direction as the operating chamber 230 tilts by the force of gravity.

Figure 11:
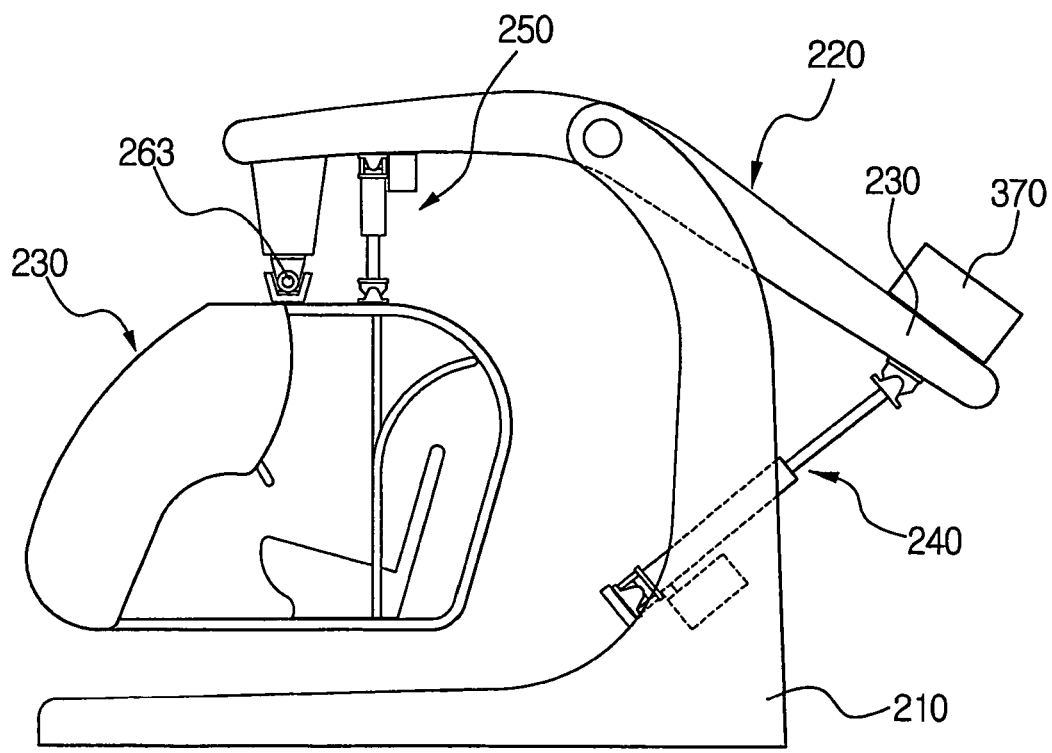
FIG. 11 is a schematic side view showing a motion simulator according to another preferred embodiment of the present invention.

Meanwhile, FIG. 11 shows the motion simulator according to a preferred embodiment of the present invention. The feature of the depicted motion simulator is that it has a counter mass 370 as the counter means which is formed at the opposite end 223 of the movable frame 220 to overcome the weight of the operating chamber 230 on the movable frame 220. Preferably, the counter mass 370 weighs in correspondence to the weight of the operating chamber 230, and is made of metal material.

In describing FIG. 11, same reference numbers are designated for parts identical to those of FIG. 8, and as the operations of both are identical, the descriptions thereof are omitted.

While the heave actuator 240 is employed as the first driving means for driving the pivotal movement of the movable frame 220 in this embodiment, this is only by way of an example and for the purpose of illustration. Another modifications are possible, such as connecting a gear (not shown) to the pivot 215, and pivoting the movable frame 220 by driving the gear with the motor.

The universal joints employed at both ends of each of the roll/pitch actuators 250 are also exemplary, and thus, generally-known joint, such as boll socket joint may be also used.

Figure 12:
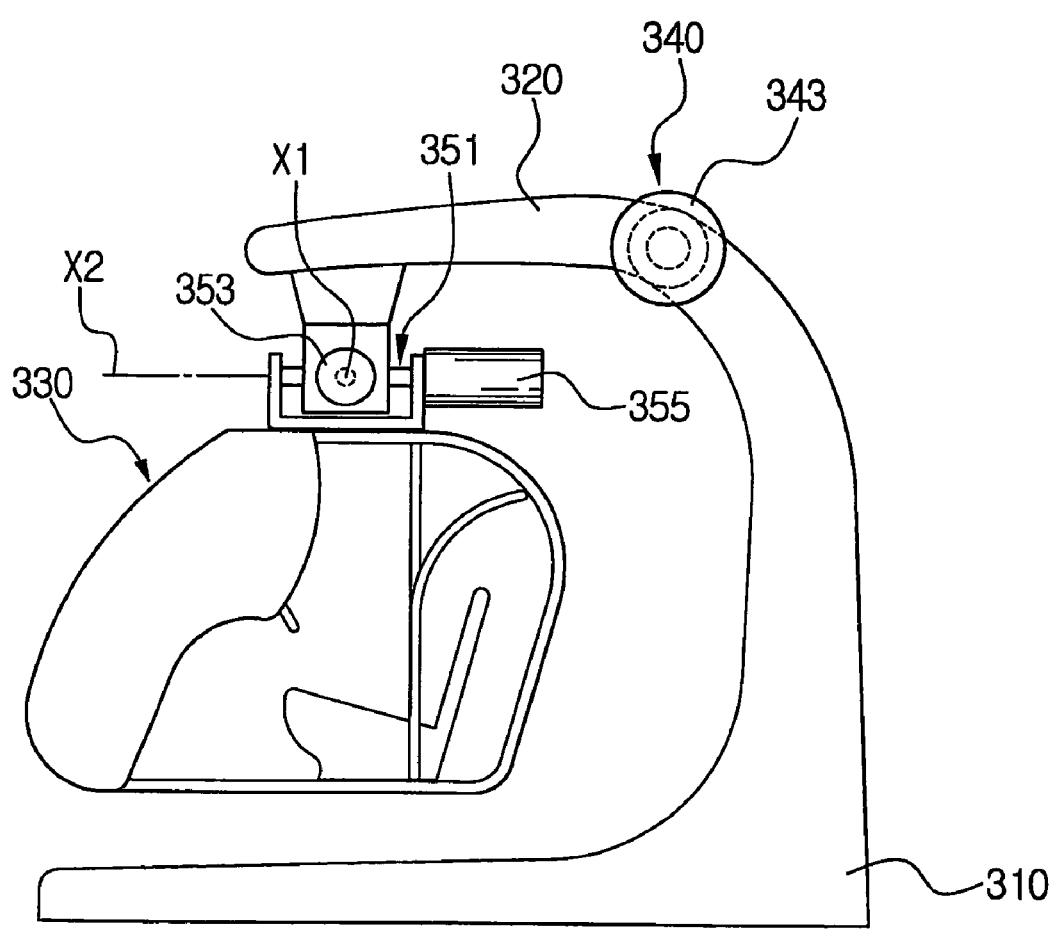
FIG. 12 is a side view showing a motion simulator according to yet another preferred embodiment of the present invention.
Figure 13:
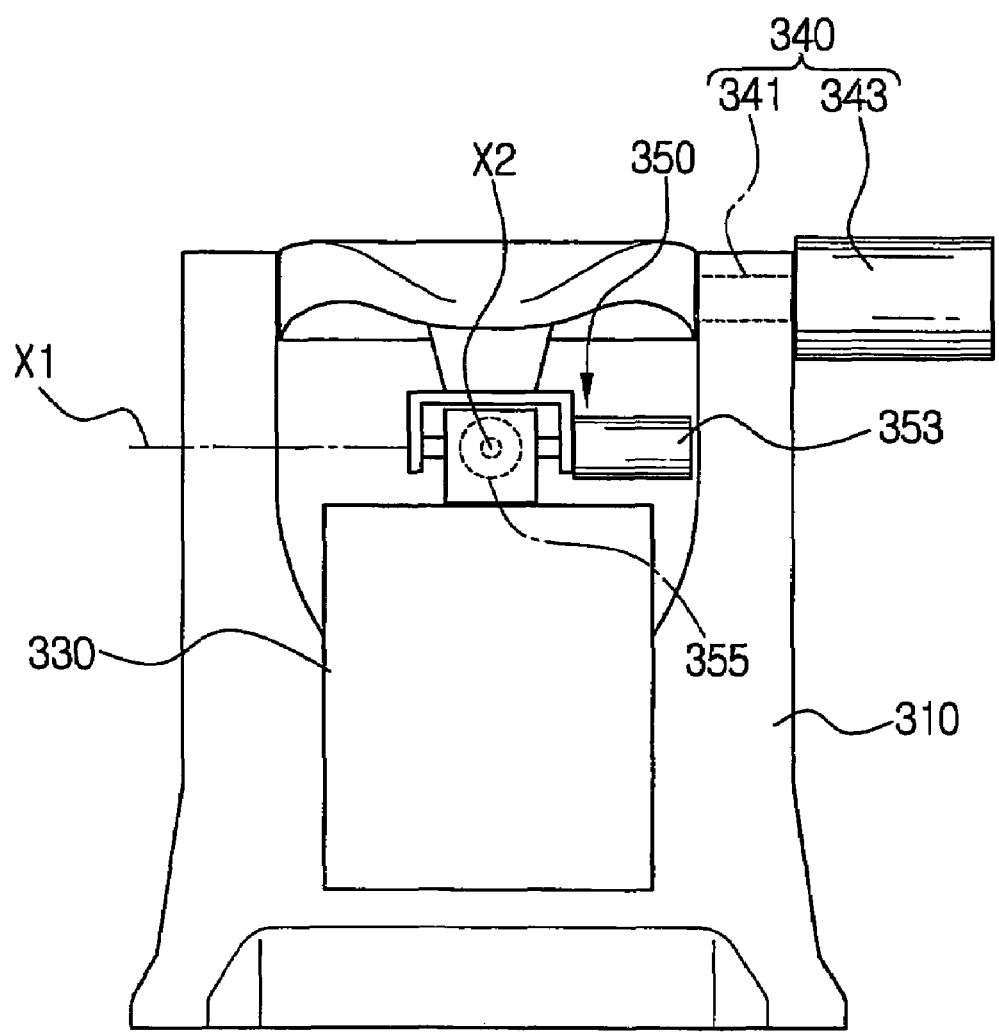
FIG. 13 is a front view showing a motion simulator according to yet another preferred embodiment of the present invention.

Meanwhile, the motion simulator according to yet another preferred embodiment of the present invention will be described with reference to FIGS. 12 and 13. Referring to FIGS. 12 and 13, a movable frame 320 is formed such that one end of the movable frame 320 is rotatable with respect to a stationary frame 310. There is an operating chamber 330 movably suspended on the other end of the movable frame 320.

The movable frame 320 is pivotable by the first driving means with respect to the stationary frame 310. The first driving means may be a first rotary actuator 340 connected with the movable frame 320 and the stationary frame 310. More specifically, the first rotary actuator 340 includes an axis 341 rotatably formed on the stationary frame 310 to support the movable frame 320, and a driving motor 343 formed on the stationary frame 310 to rotate the axis 341.

Figure 14:
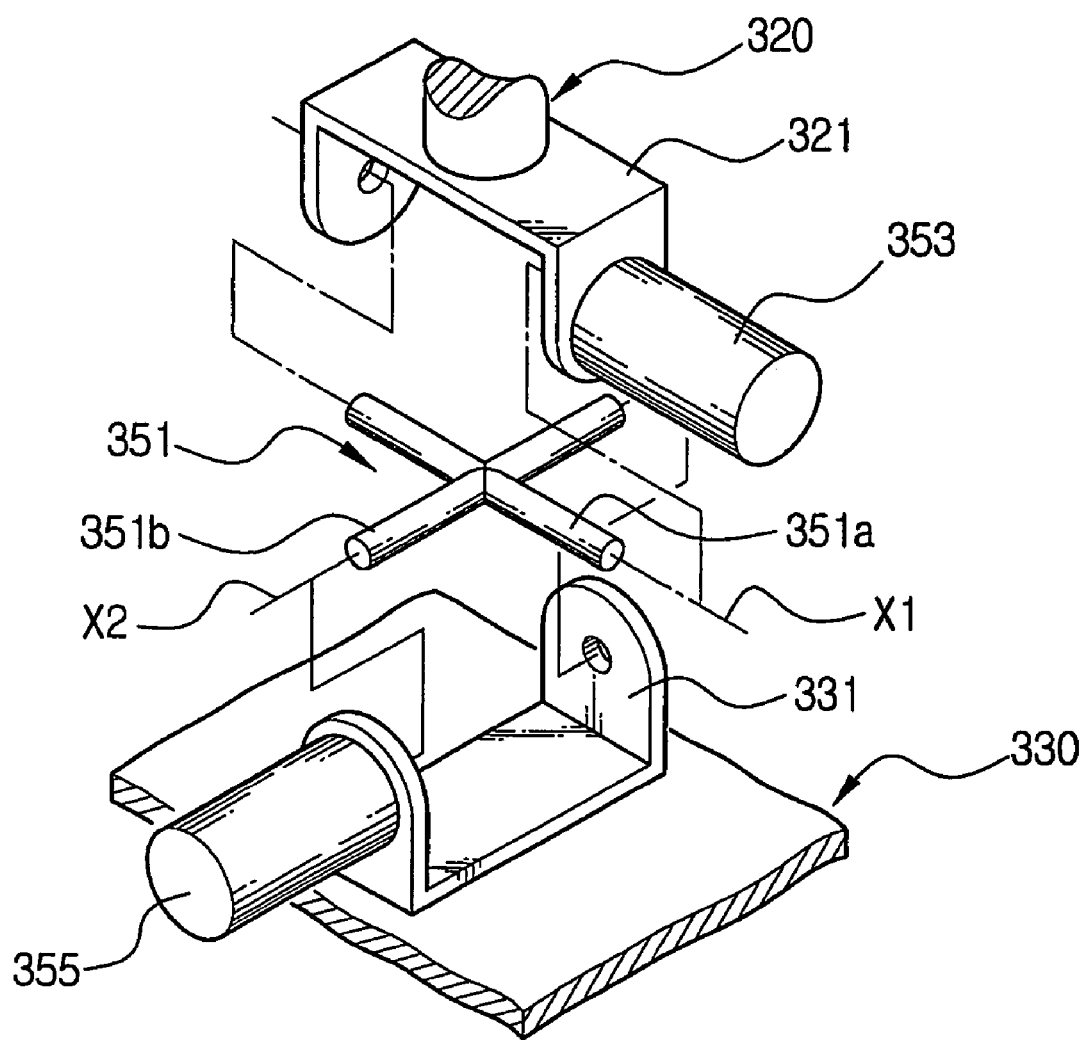
FIG. 14 is an exploded perspective view showing the main features of FIG. 12.

Further provided is a second driving means for rotating the operating chamber 330 with respect to the movable frame 320, independently on the first axis X1 and the second axis X2. The second driving means includes a second rotary actuator 350 which is installed between the movable frame 320 and the operating chamber 330 and independently driven on the respective axes X1, X2. More specifically, as shown in FIG. 14, the second rotary actuator 350 includes a cross axis 351 for connecting so as to pivot the movable frame 320 and the operating chamber 330 independently on the first and the second axes X1, X2 which are in crossing relation, a first driving motor 353 formed on the movable frame 320 to pivot the cross axis 351 about the first axis X1 thereby pivoting the operating chamber 330 with respect to the first axis X1, and a second driving motor 355 formed in the operating chamber 330 to relatively rotate the cross axis 351 about the second axis X2 thereby pivoting the operating chamber 330 with respect to the second axis X2.

The cross axis 351 has a structure in which two shafts are crossed each other, having a first shaft 351a along the first axis X1 and a second shaft 351b along the second axis X2. The first shaft 351a is rotatably supported on a first bracket 321 at its both ends. The first bracket 321 is formed at a lower portion of the movable frame 320. The second shaft 351b is rotatably supported on a second bracket 331 at its both ends. The second bracket 331 is formed on top of the operating chamber 330. To this end, the brackets 321, 331 are crossed with each other. Further, the first driving motor 353 for rotating the first shaft 351a is fixed on the first bracket 321, while the second driving motor 355 for rotating the second shaft 351b is fixed on the second bracket 331.

According to yet another preferred embodiment of the present invention, the motion simulator constructed as above may pivot the movable frame 320 through the first rotary actuator 340, while independently and simultaneously pivoting the operating chamber on two axes in different directions through the second rotary actuator 350.

With the motion simulator as described above according to the present invention, since the operating chamber is formed under the movable frame, the center of gravity of the passenger is positioned under the center of rotation of the movable frame. In other words, since the $A \times R_{pv}$ vector is in the same direction as that of the acceleration sensations that are intended to be created, undesired accelerating sensations are prevented during the creation of the accelerating sensation using force of gravity, and as a result, the time taken to track the intended moving sensations is shortened, and the moving actuality experience by the passenger is increased.

What is claimed is:

1. A motion simulator comprising:
   a stationary frame;
   a movable frame movably connected to the stationary frame by a stationary horizontal pivot axis;
   an operating chamber formed on a lower side of one end of the movable frame by a central universal joint located between the movable frame and the top side of the operating chamber;
   first driving means for pivoting the movable frame, the driving means comprised of a heave actuator connected between the other end of the movable frame and the stationary frame; and
   second driving means arranged between the operating chamber and the bottom side of the movable frame, for rotating the operating chamber around a pitch axis which is parallel to the horizontal pivot axis of the movable frame, and a roll axis which is perpendicular to the pitch axis.

2. The motion simulator of claim 1, wherein the heave actuator reciprocally pivots the movable frame with reciprocal movement.

3. The motion simulator of claim 1, wherein the second driving means comprises:
   a plurality of roll/pitch actuators connecting the movable frame and the operating chamber; and
   a central universal joint connected between the operating chamber and the movable frame, for limiting an unintended movement of the operating chamber with respect to the movable frame.

4. The motion simulator of claim 3, wherein the second driving means comprises two linear roll/pitch actuators provided in pair which actuators are connected to the operating chamber and the movable frame by universal joints and located symmetrically with one actuator on each side of a vertical plane perpendicular to the pitch axis, passing through the center of the central universal joint and to one side of a vertical plane perpendicular to the roll axis and through the center of the central universal joint, such that extension of one actuator and retraction of the other actuator by equal amounts will cause rotation of the operating chamber about the roll axis, and equal extension or retraction of both actuators will cause rotation about the pitch axis.

5. The motion simulator of claim 1, further comprising a counter means provided at the other end of the movable frame, for overcoming a weight of the operating chamber on the movable frame.

6. The motion simulator of claim 5, wherein the counter means comprises a counter spring connected between the other end of the movable frame and the stationary frame.

7. The motion simulator of claim 5, wherein the counter means comprises a counter mass formed at the other end of the movable frame, and weighed in correspondence with the weight of the operating chamber.

8. The motion simulator of claim 1, wherein the first driving means comprises a first rotary actuator connected to the other end of the movable frame and to the stationary frame, for pivoting the movable frame upward and downward.

9. The motion simulator of claim 1, wherein the second driving means comprises a second rotary actuator formed between the movable frame and the operating chamber, for independently pivoting the movable frame and the operating chamber on first and second axes.

10. A motion simulator comprising:

a stationary frame;

a movable frame movably connected to the stationary frame;

an operating chamber formed on a lower side of one end of the movable frame;

first driving means for pivoting the movable frame; and second driving means arranged between the operating chamber and the movable frame, for rotating the operating chamber with respect to the movable frame, wherein the second driving means comprises a second rotary actuator for independently pivoting the movable frame and the operatinn chamber on first and second axes, and wherein the second rotary actuator comprises:

a cross axis connecting the movable frame and the operating chamber such that the movable frame and the operating chamber are independently pivoted on the first and the second axes, the first axis crossing the second axis;

a first driving motor formed on the movable frame, for pivoting the operating chamber about the first axis by pivoting the cross axis about the first axis; and a second driving motor, for pivoting the operating chamber about the second axis by relatively rotating the cross axis about the second axis.

11. The motion simulator of claim 10, used in combination with a passenger chamber, wherein the second driving motor is formed in the passenger chamber.

* * * * *